United States Patent [19]

Craig et al.

[11] Patent Number: 4,488,925

[45] Date of Patent: Dec. 18, 1984

[54] SERVO MOTOR CONTROLLED LABELER

[75] Inventors: Alan J. Craig, Afton; Thomas F. Look, Anoka, both of Minn.

[73] Assignee: Minnesota Mining and Manufacturing Company, St. Paul, Minn.

[21] Appl. No.: 474,546

[22] Filed: Mar. 11, 1983

[51] Int. Cl.[3] .................... B32B 31/00; G05G 15/00; B65H 25/00; B65H 25/22

[52] U.S. Cl. .................................. 156/351; 156/361; 156/542; 156/584; 242/75.43; 242/75.5; 192/0.096

[58] Field of Search .......................... 242/75.43-75.5; 192/45, 0.002 R, 0.075, 0.096; 156/351, 361, 542, 584

[56] References Cited

U.S. PATENT DOCUMENTS

| | | | |
|---|---|---|---|
| 4,091,913 | 5/1978 | Ku et al. | 400/196 |
| 4,183,779 | 1/1980 | Barber et al. | 156/361 |
| 4,256,270 | 3/1981 | Lee et al. | 242/75.5 |
| 4,267,004 | 5/1981 | Anderson | 156/361 |
| 4,294,644 | 10/1981 | Anderson | 156/361 |
| 4,318,138 | 3/1982 | Osanai | 360/24.1 |
| 4,326,225 | 4/1982 | Osanai | 360/24.1 |

*Primary Examiner*—Edward Kimlin
*Assistant Examiner*—Merrell C. Cashion
*Attorney, Agent, or Firm*—Donald M. Sell; James A. Smith; David W. Anderson

[57] ABSTRACT

A labeling mechanism is provided which utilizes a servo motor driven capstan to rapidly accelerate and decelerate label stock through the mechanism. Rapid acceleration is permitted because a secondary motor is provided to a label stock supply reel to reduce system inertia. Rapid deceleration is possible because a one-way bearing and clutch assembly is provided which prevents reverse motion of the label stock. A label shear is also provided which permits the use of continuous label stock rather than die cut, spaced labels.

8 Claims, 4 Drawing Figures

SERVO MOTOR CONTROLLED LABELER

BACKGROUND OF THE INVENTION

1. Field of the Invention

This invention relates to apparatus for applying labels to a moving surface which may be the surface of an item being fed along a conveyer or the surface of a traveling web, the apparatus providing for high-speed, precise label placement at a desired position on the moving surface.

2. Description of the Prior Art

The demand for accurate and high-speed labeling machines has increased due to the development of labeling schemes such as that described in U.S. Pat. No. 4,183,779, wherein a series of high-speed labelers are required to accurately position color-coded die cut labels in order to consecutively number a series of file folders. When used in such applications, the limitations of existing automatic labeling machines have become apparent. Such existing labelers dispense self-adhesive die cut labels mounted on a carrier web or liner which is drawn from a supply reel and passed sharply around the smooth end of a peeling surface or splitter tongue which causes the labels to separate from the liner. The liner is then drawn backwards by a take-up which is typically a capstan and pressure roller which grip the web therebetween. Rotation of the capstan effects feed of the labels which move forwardly of the peeling surface while the liner is delivered to a take-up reel.

The capstan is normally driven through a friction clutch mechanism used in conjunction with a driving motor. The capstan is started and stopped for each label dispensed or article labeled. The motion of the capstan is necessarily a nearly instantaneous start/stop operation within the mechanical limitations of the driving mechanism employed. The sudden, intermittent motion of the mechanism translates into limited labeler life and may result in breakage of the liner, particularly if the inertia of the tape supply is high.

U.S. Pat. No. 4,294,644 has attempted to overcome these problems by providing a labeler mechanism which gradually accelerates the label to the speed of the item to be labeled and gradually decelerates a subsequent label to a predetermined position. Gradual acceleration and deceleration of the liner and labels has resulted in increased accuracy, extended labeler life and the practical elimination of liner breakage. However, these advantages have been achieved at the expense of increased cost and reduced reliability because of the complexity of the control system which must be employed.

It is desirable, therefore, to provide a labeler mechanism which is relatively less complex in construction and yet will produce the positional accuracy achieved by the aforementioned labeler mechanism. Increased speed of label application is a continuing goal.

In addition, it would be desirable to produce a labeling mechanism which could utilize a continuous length of labeling material attached to the liner rather than the discrete, die cut labels of the prior art. A continuous label construction would reduce costs, eliminate the possibility of lost or misaligned labels and permit greater control over label stock, thus reducing the possibility of misappropriated labels beein applied to unauthorized goods. The aforementioned U.S. Pat. No. 4,294,644 is not capable of utilizing label stock consisting of continuous labeling material affixed to a liner.

SUMMARY OF THE INVENTION

A labeler mechanism according to the present invention dispenses and applies labels accurately and rapidly to an item from a continuous label stock by providing a liner drive servo motor capable of high rates of acceleration, a one-way clutch and bearing assembly, motors which control a label supply reel and a liner take-up reel, and a shear which cuts the continuous label stock into discrete labels of a desired length.

The liner drive servo motor produces rapid, but controlled, acceleration of the liner and the attached label stock and such rapid acceleration is possible because the label stock supply reel motor controls the tension in the liner between the supply reel and the drive servo motor and also overcomes the inertia of the supply reel. Rapid deceleration of the liner and its attached label stock is produced by applying a full reverse polarity voltage to the drive servo motor. This reverse polarity voltage can be applied without actually reversing the direction of the servo motor or the liner because the one-way clutch and bearing assembly is connected to the servo motor's shaft and only permits rotation in the direction of liner advancement. A solenoid operated label shear is actuated shortly prior to the stopping of the liner to cut the continuous label stock to a predetermined length. A separate motor is provided to rotate the take-up reel and wind the liner as it exits past the capstan.

BRIEF DESCRIPTION OF THE DRAWING

The present invention will be more thoroughly described with reference to the accompanying drawings, wherein like numbers refer to like parts in the several views, and wherein.

DESCRIPTION OF THE PREFERRED EMBODIMENT

Figure 1:
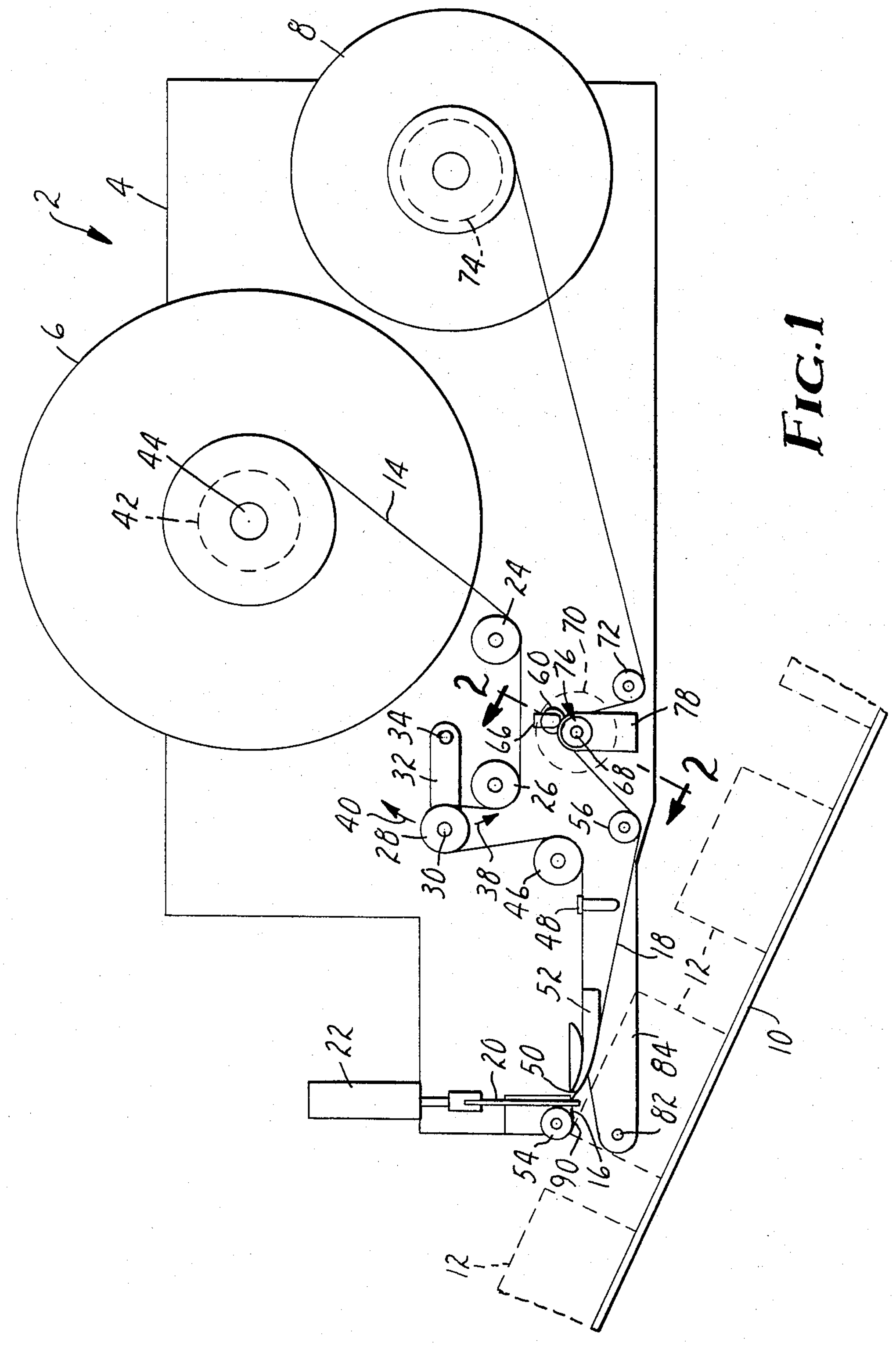
FIG. 1 is a simplified elevational view of a labeling apparatus embodying the invention and showing the labeling apparatus being used to apply labels to an item being fed therepast on an endless conveyer.

FIG. 1 illustrates a labeling mechanism generally designated with reference numeral 2 which is of the type that is rotary driven to dispense labels carried on a carrier web or liner onto a moving surface. The labels, which have a pressure-sensitive adhesive backing and are prevented from firmly adhering to the liner by a suitable release substance, are dispensed by pulling the carrier web around an abrupt edge so that the labels are separated from the liner and delivered down onto the receiving surface being fed therepast. A detailed description of the operation of such a labeling mechanism is contained in U.S. Pat. Nos. 4,267,004 and 4,294,644, issued May 12, 1981 and Oct. 13, 1981, respectively, to Anderson which are incorporated by reference herein. The present invention resides in the apparatus used to drive the liner and attached labels rather than in the general configuration or operation of the labeling mechanism 2 itself.

The labeling mechanism 2 comprises a housing 4 to which is rotatably connected a label supply reel 6 and a liner take-up reel 8. The labeling mechanism is suitably suspended above a conveyor belt 10 along which items 12 to be labeled may be moved past the labeling mechanism 2.

The supply reel 6 is adapted to support a supply of convolutely wound label stock 14 comprising a continuous label tape 16 having a pressure-sensitive adhesive backing superposed on a liner 18. The liner 18 may be treated with a suitable release agent such as silicone so that the adhesive coating may be easily separated from the liner 18. Label stock used in prior art mechanisms, such as that described in U.S. Pat. Nos. 4,267,004 and 4,294,644, has consisted of discrete, die cut labels spaced along the length of a liner. The labeling mechanism 2 of the present invention may use such die cut labels or preferably may use a continuous label stock 14 as described herein because the mechanism 2 is provided with a shear 20 which is operated by a solenoid 22 in a manner to be described hereinafter to cut the continuous label tape 16 into discrete sections which are applied to the item 12.

Figure 4:
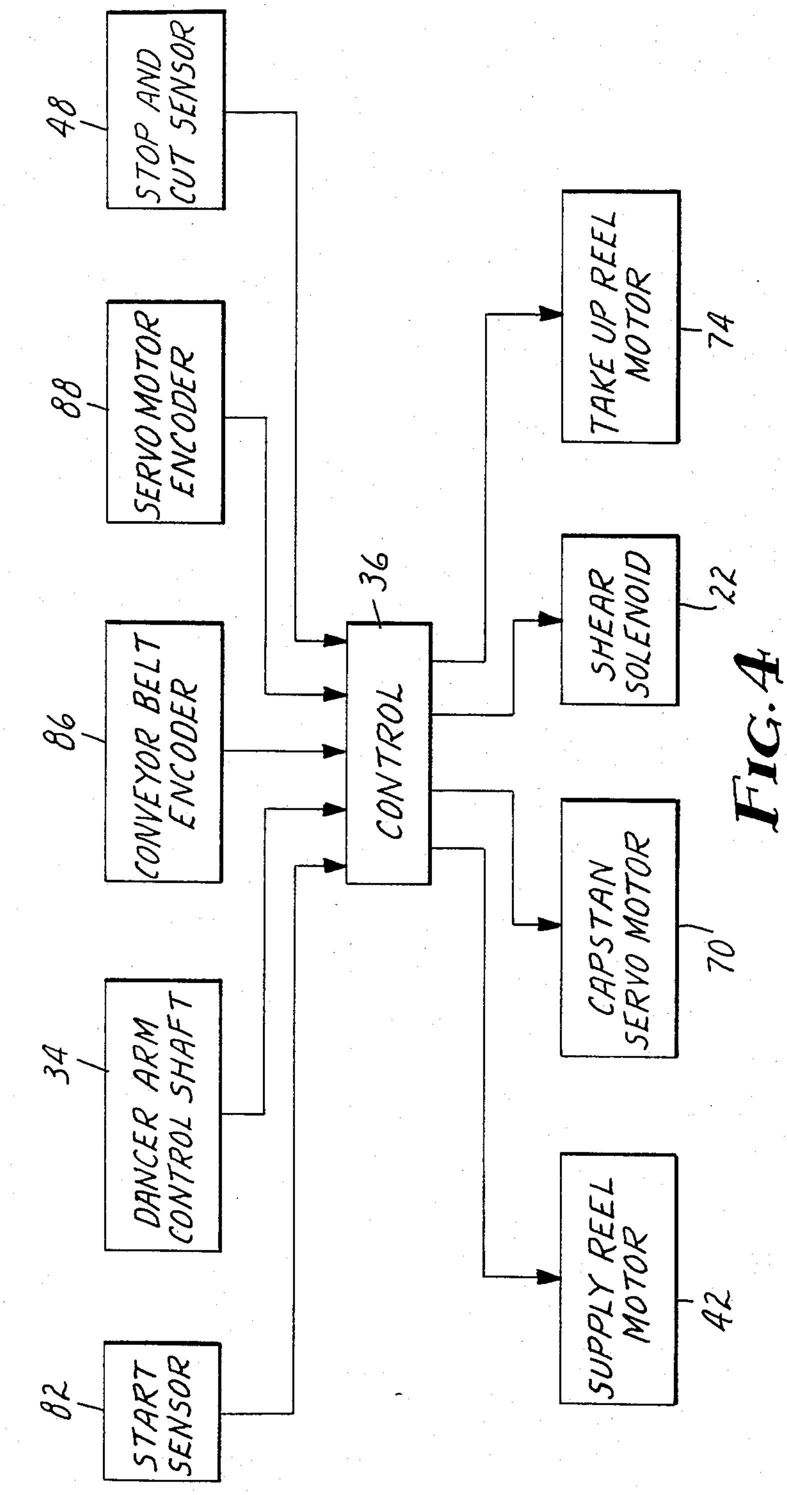
FIG. 4 is a block diagram representing the relationship of a control and the components of the labeling apparatus of the present invention.

The label stock 14 is routed past idler rolls 24 and 26 rotatably attached to the housing 4 and around a roll 28 mounted on a shaft 30 at the end of a dancer arm 32, which is in turn pivotally mounted on a control shaft 34 attached to a control 36 (FIG. 4). The dancer arm 32 can move in the directions illustrated by arrows 38 and 40 to rotate the control shaft 34 and produce a signal through the control 36. This signal operates to regulate a motor 42 which rotates a shaft 44 upon whih the supply reel 6 is mounted. Increased tension in the label stock 14 will cause the dancer arm 32 to move in the direction of arrow 38 and result in a signal to the supply reel motor 42 that increased rotational velocity is required. The dancer arm 32 is biased toward the direction indicated by the arrow 40 and therefore reduced tension in the label stock 14, which may be caused by over-rotation of the supply reel 6, results in the dancer arm 32 moving in the direction of arrow 40 and rotation of the control shaft 34 in a direction which signals that the supply reel motor 42 is to decrease its rotational velocity. Thus, the control 36 associated with the dancer arm 32 operates to maintain the dancer arm 32 in a horizontal neutral position and to thereby maintain a constant, low tension on the label stock 14. Tension on the label stock 14 is maintained at a low value because the inertia of the supply reel 6 and wound label stock 14 is compensated for by the supply reel motor 42 and high tension on the label stock 14 need not be provided to overcome this inertia.

Although a pivoting dancer arm 32 has been shown, it should be recognized that this arm 32 need not be provided and that the dancer roll 28 could translate along a slot to perform the same function. All that is required is that the roll 28 be free to move in response to an increase or decrease in label stock 14 tension and that this motion of the roll 28 can be sensed by a control 36 which regulates the motor drive 42 for the supply reel 6.

After being routed to the dancer arm roll 28, the label stock 14 circles another idler roll 46 and passes a stop and cut sensor 48. The stop and cut sensor 48 is conventional in operation and structure and is preferably a photoelectric device which senses marks spaced along the label tape 16 or liner 18 to provide a signal which may be used to operate the label shear 20 at an appropriate time in the labeling cycle and also stop the advancement of label stock 14.

If die cut labels are to be employed, the sensor 48 may sense the edge of a label to provide the signal to stop advancement of the label stock. Operation of the shear 20 would, of course, not be necessary.

After the stop and cut sensor 48, the label stock 14 is routed around a peeling edge 50 of a splitter tongue 52 around which the label stock 14 is drawn and which effects the separation of the label tape 16 from the liner 18. This is possible because the label tape 16 has a greater stiffness than the liner 18 and because the liner 18 is treated with a suitable release coating. The length of label tape 16 extending beyond the peeling edge 50 is then applied to the item 12 by a spring-loaded applicator wheel 54 which presses the tape 16 into position.

The liner 18 is then led past the splitter tongue 52 and an idler roll 56 and is captured between a capstan 58 and a pressure roll 60. The pressure roll 60 is mounted on a shaft 64 attached to a spring-loaded arm 66 and is urged against the capstan 58 with a force sufficient to positively engage the liner 18. The capstan 58 is mounted on a motor shaft 68 which is driven by a servo motor 70 which controls the movement of the liner 18 and its attached label tape 16 throughout the labeling mechanism 2. A suitable gripping material, such as rubber, may be provided on either the capstan 58 or the pressure roll 60.

After passing around the capstan 58, the liner 18 is directed past a final idler roll 72 to the take-up reel 8 which is suitably driven, preferably by an electric motor 74, to wind the liner 18 as it passes out of the labeling mechanism 2.

The servo motor 70 connected to the capstan 58 is preferably a low inertia, high torque, direct current servo motor which is capable of producing a high rotational acceleration. Servo motors presently available have maximum accelerations in excess of 36,000 radians per second per second and permit the very rapid acceleration of the label stock 14 to the speed of the item 12 to be labeled. The motor 70 described may also be extremely rapidly decelerated by reversing the polarity of the voltage applied to the motor. Rapid acceleration and deceleration of the liner 18 and label tape 16 greatly increases the number of labels which may be applied per unit of time and also permits an increase in the speed with which the item 12 to be labeled may be conveyed past the labeling mechanism 2.

Figure 2:
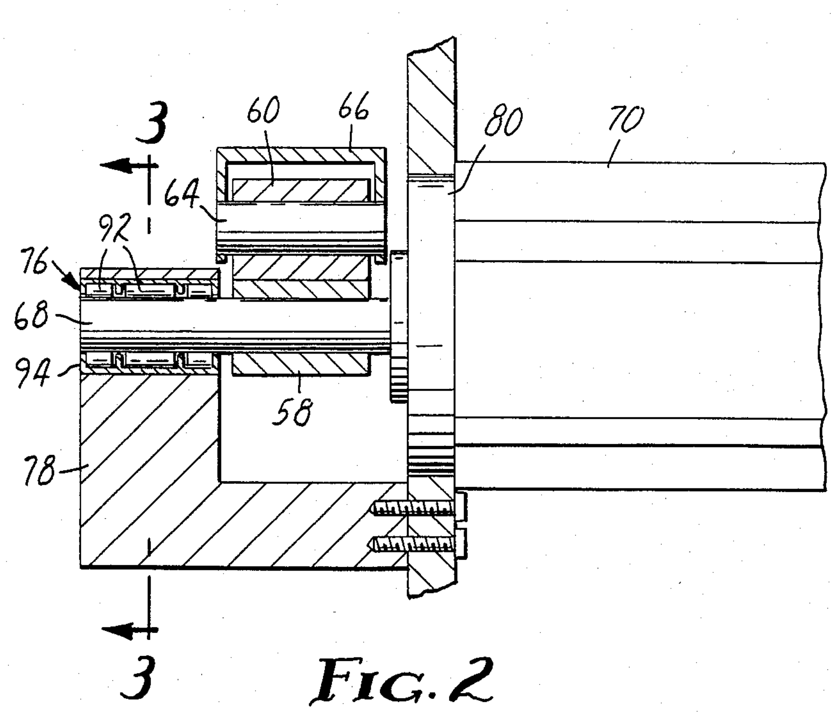
FIG. 2 is a sectional view of a liner drive portion of the invention taken generally along the line 2—2 of FIG. 1.

The rapid deceleration of the servo motor 70 by reversing the polarity of the applied voltage is possible without actually reversing the rotation of the capstan 58 and driving the liner 18 toward the supply reel 6 because the motor shaft 68 is journaled in a one-way bearing and clutch assembly 76 which only permits rotation of the motor shaft 68 in the direction of liner 18 advancement. As shown in FIG. 2, the bearing and clutch assembly 76 is supported by a cantilever arm 78 projecting from the housing 4. The motor shaft 68 and capstan 58 are thus supported between the bearing and clutch assembly 76 and a bearing 80 in the housing 4. Although it is possible to locate the bearing and clutch assembly in place of the housing bearing 80 or between the capstan 58 and the shaft 68, the arrangement described is preferable, one reason being the additional support provided the shaft 68.

OPERATION

In operation to label an item 12 being conveyed toward the applicator wheel 54, the item 12 is initially detected by a start sensor 82 located on the end of an arm 84 extending from the housing 4.

The start sensor 82 may be a conventional photoelectric device or a mechanical device such as a feeler contact. Detection of the item 12 by the sensor 82 causes a signal to be generated which operates through the control 36 to initiate rotation of the capstan 58 in a clockwise direction, as viewed in FIG. 1, and thereby cause movement of the liner 18 in a direction from the supply reel 6 toward the take-up reel 8. The one-way bearing and clutch assembly 76 is oriented to permit free movement of the liner 18 in this direction, which shall hereinafter be referred to as the forward direction.

When the start sensor 82 detects an item 12, the control 36 begins receiving pulses from an encoder 86 which is either attached to the belt 10 or a motor (not shown) which drives the belt 10. This encoder 86 may be a disk or strip having alternate light and dark areas, holes or spaced ridges which may be detected by a photoelectric device or a mechanical feeler to produce the pulses which indicate the position of the item 12 relative to the labeling mechanism 2. The control 36 also contains a circuit which measures the time between and number of pulses generated by the conveyer encoder 86 to produce an indication of the distance traveled and velocity of the item 12. Detection of the item 12 by the start sensor 82 causes the control 36 to initiate rotation of the capstan 58 by its associated drive servo motor 70 through shaft 68. The capstan 58 rotates in a clockwise direction as viewed in FIG. 1 and causes the liner 18, and thereby the label stock 14, to move in the forward direction. Rotation of the capstan 58 and subsequent movement of the liner 18 may be initiated either immediately upon detection of the item 12 by the start sensor 82 or after a suitable delay. The length of such delay, if any, is determined by the control 36 and will depend upon the velocity of the item 12, the available acceleration of the servo motor 70 which drives the capstan 58 and the desired position of the label tape 16 on the item 12.

It is contemplated that the servo motor 70 associated with the capstan 58 be of the low inertia, high torque type, such as those manufactured by the Kollmorgen Corporation of Syosset, New York, which are capable of controlled accelerations in excess of 36,000 radians per second per second. Such rapid acceleration is desirable because it allows the speed of the item 12 to be labeled to be increased, thus resulting in a greater number of items 12 labeled per unit time than is possible when a labeling mechanism such as described in U.S. Pat. No. 4,294,644 is employed. The servo motor 70 is provided with an encoder 88 similar to that provided either to the belt 10 or the motor which drives the belt 10 so that the rotational velocity of the servo motor 70 may be determined and controlled to match the velocities of the item 12 and the label tape 16 to be applied. The servo motor 70 is initially accelerated to a velocity in excess of the velocity of the item 12 so that the free end 90 of the label tape 16 will reach a predetermined point on the item 12. When the control determines that the positions of the label tape 16 and the item 12 are matched, the velocity of the capstan 58, and consequently the label tape 16, is reduced to a velocity which matches that of the traveling item 12. The label tape 16 is then applied to the item 12 by the applicator wheel 54 in a manner described in U.S. Pat. Nos. 4,267,004 and 4,294,644.

When the label stock 14 is moved in the forward direction by the capstan 58, there results an increased, but slight, tension in the label stock 14 between the capstan 58 and the supply reel 6 which causes the dancer arm 32 to move in the direction indicated by the arrow 38. This movement of the dancer arm 32 causes rotation of the control shaft 34 which in turn generates a signal through the control 36 which initiates rotation of the motor 42 which drives the supply reel 6. Very low inertia is presented to the capstan 58 because the dancer arm 32 is relatively easily moved from its normally horizontal position and because the motor 42 driving the supply reel 6 causes compensating rotation of the reel 6 before the dancer arm 32 reaches the limit of its travel in the direction of the arrow 38. Therefore, the only inertia which the capstan 58 must overcome is the inertia produced by the very small mass of the length of label stock 14 between the capstan 58 and the dancer arm roll 28 and the inertia caused by the mass of the dancer arm 32, the mass of the dancer arm roll 28 and the force of the spring which attempts to maintain the dancer arm 32 in a horizontal position. This inertia is obviously very much less than the inertia which would have to be overcome if it were attempted to rotate the label supply reel 6 and the label stock 14 wound thereon.

As the label tape 16 is advanced and applied to the item 12, one of a series of black lines marked on the label tape 16 or the liner 18 approaches the stop and cut sensor 48. The mark on the label tape 16 or liner 18 does not actually correspond to the end of the particular label 16 being applied to the item 12, but since the labels 16 are in the form of a continuous strip, the spacing between lines will correspond very accurately to the length of an individual label. The stop and cut sensor 48 can thus sense a black mark spaced two or three label lengths distant from the label actually being applied to the item 12 and still accurately determine the correct length of the label applied.

When the sensor 48 dectects this black stop line, the solenoid 22 is energized and the label shear 20 begins in motion. Very shortly after the solenoid 22 is energized, the control 36 applies full reverse polarity voltage to the servo motor 70 connected to the capstan 58. The capstan 58 will then decelerate at a deceleration in excess of 36,000 radians per second per second which is in specification for the particular motor selected, as described above. The sequence of energization of the solenoid 22 and the application of reverse voltage to the servo motor 70 occurs in something less than 6 to 8 milliseconds and, therefore, although the label tape 16 is cut while still in motion, there is not sufficient time for the label tape 16 to be significantly stretched or otherwise distorted and there is not sufficient time for the sheared free edge 90 of the label tape 16 to be crowded against the shear 20 and distorted. In addition, there is no need to keep track of the position of the edge 90 of the subsequent label, as is done in U.S. Pat. No. 4,294,644, because this label can only travel an extremely short distance in the time period between application of the stop signal and the actual stoppage of the label.

Full reverse polarity voltage may be applied to the servo motor 70 without reversing the direction of the liner 18 because the one-way bearing and clutch assembly 76 is provided which prevents counter-rotation of the motor 70 and rearward motion of the liner 18, i.e., movement of the liner in a direction from the capstan 58 toward the supply reel 6.

Figure 3:
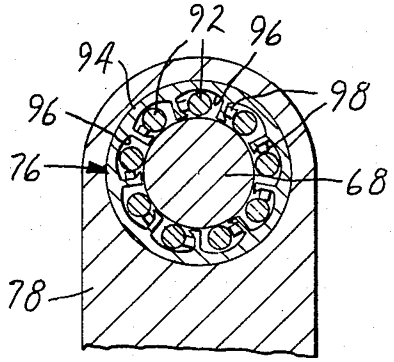
FIG. 3 is a sectional view of the one-way clutch and bearing assembly taken generally along the line 3—3 of FIG. 2.

The one-way clutch and bearing assembly 76 is shown in FIG. 3 and is of the type which includes a number of bearing rollers 92 located within a bearing cup 94 having a ramped surface 96 cooperating with each of the rollers 92. In the free rotation or overrun mode, the rollers 92 move toward that portion of the ramps 96 which provide the greatest clearance between the motor shaft 68 and the bearing cup 94. In the lock mode, which occurs when the shaft 68 is attempted to be rotated in the opposite direction, the rollers 92, assisted by leaf springs 98, become wedged between the ramped surfaces 96 of the bearing cup 94 and the shaft 68 to transmit torque between the shaft 68 and the bearing support 78 and prevent rotation. Such one-way clutch and bearing assemblies 76 are manufactured by the Torrington Company of Torrington, Conn.

The control 36 has been described as performing a number of functions. The relationship of the control 36 and the components of the labeling apparatus 2 is represented schematically by the block diagram of FIG. 4 wherein arrows terminating at the control represent data received by the control 36 and arrows leaving the control 36 represents signals operating or regulating the various components. FIG. 4 indicates that the control receives data from the start sensor 82 to initiate rotation of the servo motor 70, from the dancer arm control shaft 34 to regulate the supply reel motor 42, from the stop and cut sensor 48 to operate the shear solenoid 22 and also reverse the polarity of the servo motor 70, and from the servo motor encoder 88 and the belt encoder 86 to regulate the rotational velocity of the servo motor 70 and operate the take-up reel motor 74.

The labeling mechanism 2 described above provides a system which is faster, less complex and cheaper than the labeling system described in U.S. Pat. No. 4,294,644. The present labeling mechanism 2 is faster in that it can apply more labels per unit of time to items 12 traveling at a faster rate than is possible with the above-noted system because the present labeling mechanism 2 applies labels at a rate which is for all practical purposes instantaneous and need not provide for gradual acceleration and deceleration of the label stock. The present mechanism 2 is less complex because the speed of the system permits the elimination of devices used in U.S. Pat. No. 4,294,644 which accelerate and decelerate the label and keep track of the position of the end of the label stock. Elimination of these components also provides a labeling mechanism 2 which is cheaper and more reliable.

Although the labeling mechanism 2 of the present invention has been described with respect to a single embodiment, it is to be understood that the invention is not to be limited to the embodiment described. The scope of the invention is intended to be that which corresponds to the appended claims.

We claim:

1. In a labeling mechanism for dispensing and applying labels from a label stock including label tape and a liner to a moving item and including a supply reel around which is convolutely wound a supply of the label stock, a servo motor driven capstan engaging the liner to advance the label stock from the reel and toward the item and an edge disposed between the reel and the capstan and adapted to cause the label to be separated from the liner, the improvement comprising:

a one-way clutch and bearing assembly connected to said servo motor which permits movement of said liner from said supply reel and prevents movement of said liner toward said supply reel by allowing rotation of said servo motor in one dircction only so that a reverse polarity voltage may be applied to said servo motor without causing movement of said liner toward said supply reel.

2. An improved labeling mechanism according to claim 1 further including a motor connected to said supply reel and responsive to tension in said liner between said supply reel and said capstan for rotating said supply reel and adjusting said tension.

3. An improved labeling mechanism according to claim 2 further including a dancer which moves in response to liner tension and a control which regulates rotation of said supply reel motor in response to movement of said dancer to increase or decrease rotation of said supply reel and thereby decrease or increase liner tension, respectively.

4. An improved labeling mechanism according to claim 3 wherein said dancer comprises a roll supported by an arm mounted on a shaft rotatably mounted to said housing and wherein said arm is biased against tension in said liner so as to be maintained in a neutral position by a predetermined liner tension, said arm and shaft rotating from said neutral position in response to an increase or decrease in liner tension.

5. An improved labeling mechanism according to claim 1 further including a dancer which moves in response to liner tension and a control means for regulating rotation of said supply reel in response to movement of said dancer to increase or decrease rotation of said supply reel and thereby decrease or increase liner tension, respectively.

6. An improved labeling mechanism according to claim 5 wherein said dancer comprises a roll supported by an arm mounted on a shaft rotatably mounted to said housing and wherein said arm is biased against tension in said liner so as to be maintained in a neutral position by a predetermined liner tension, said arm and shaft rotating from said neutral position in response to an increase or decrease in liner tension.

7. An improved labeling mechanism according to claim 1 wherein said one-way bearing and clutch assembly comprises a plurality of rollers contained between a shaft extending from said servo motor and a bearing cup including ramped interior surfaces corresponding to said rollers, said surfaces being inclined toward said shaft to a reduced spacing less than the diameter of said rollers so that attempted rotation of said shaft toward said reduced spacing will cause said rollers to be wedged between said ramped surfaces and said shaft whereby rotation of said shaft will be prevented.

8. An improved labeling mechanism according to claim 7 wherein said one-way bearing and clutch assembly is disposed between said housing and said servo motor shaft.

* * * * *